United States Patent Office 3,472,269
Patented Oct. 14, 1969

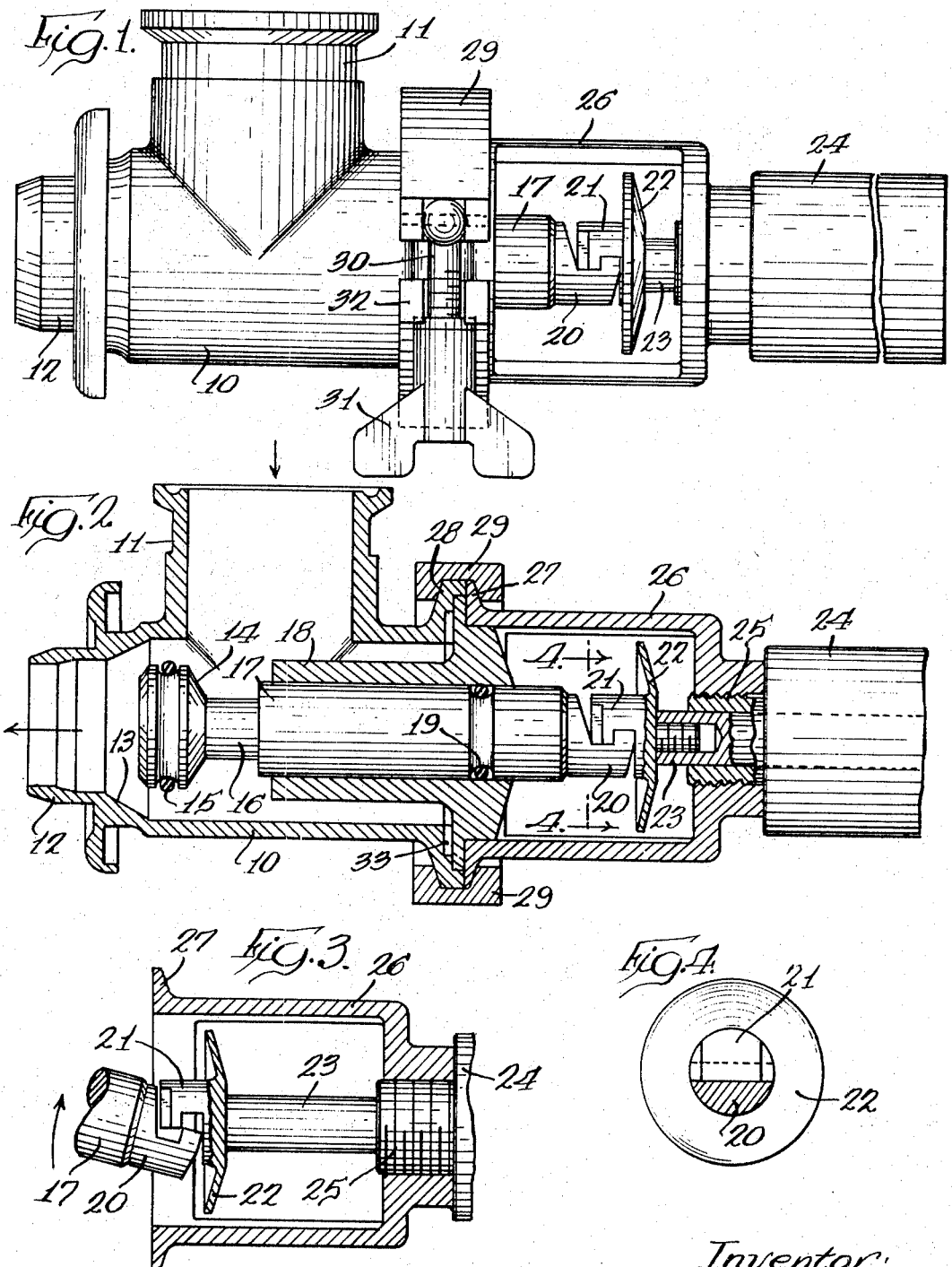

3,472,269
MOTOR TO VALVE STEM CONNECTION WITH FINGER-LIKE PROJECTIONS
William R. Scholle, Long Beach, Calif., assignor to Scholle Container Corporation, Northlake, Ill., a corporation of Illinois
Filed Nov. 21, 1967, Ser. No. 684,678
Int. Cl. F16k 23/00, 31/143, 31/00
U.S. Cl. 137—312
4 Claims

ABSTRACT OF THE DISCLOSURE

A valve assembly comprising a pneumatic actuating cylinder and piston, and a valve body including a valve stem, the stem and piston being freely interdigitated for quick and simple operative engagement and disengagement.

---

This invention relates to a readily disassemblable sanitary valve assembly such as for the filling of containers with milk and as a result must be readily cleanable and its parts separable and moreover the liquid being delivered through the valve assembly must be kept shielded from contaminating gases or liquids, and it is the object of the present invention to accomplish such results.

In general the present invention comprises a valve body having an inlet and outlet valve seat therein and a valve head with connecting stem, the valve being adapted to be actuated by a pneumatic means such as an air cylinder having a cylinder piston. In accordance with the present invention the valve body and the pneumatic cylinder are secured together by a readily disassemblable adapter and the ends of the valve stem and cylinder piston terminate within the connector body in anchor or finger-like portions adapted to readily engage with each other in what is termed herein interdigitation without the necessity for the use of connecting pins, screws or threads.

The invention comprises further details of construction and arrangement of parts which serve to maintain the ready disassemblability of the pneumatic cylinder and valve body, for shielding the liquid passing through the valve body and to permit the interconnecting parts to be readily disassembled and cleaned as will be apparent from a consideration of the following specification and accompanying drawings wherein, FIG. 1 is a side elevational view of the valve assembly of the present invention.

FIG. 2 is a longitudinal section thereof.

FIG. 3 is a fragmentary section of an intermediate connector body showing the ends of the cylinder piston and valve stem diagrammatically indicating the manner of their association.

FIG. 4 is a section on the line 4—4 of FIG. 2.

Referring to the drawings, the reference numeral 10 generally indicates a valve body having an inlet port 11 and an outlet port 12, the inlet port 11 being adapted to be connected to a fluid delivery line and the outlet port 12 being adapted to be connected to a receptacle to be filled such as for example a plastic bag which is to be filled with milk introduced to the inlet 11.

The valve body 10 is provided with an internal seat 13 against which there is adapted to be seated the valve head 14 carrying the O-ring 15. The valve head 14 carries a valve stem comprising the parts 16 and 17, the latter being reciprocal within the bushing 18 whereat the valve stem is further provided with an O-ring 19 to maintain the parts sealed.

The end of the valve stem 17 opposed to the head 14 terminates in a hooked or bent finger portion 20 whereat it engages a similar hooked or bent finger portion 21, which is connected through intermediate concentric or circular shield 22 to the piston 23 associated with the air cylinder 24.

The threaded member 25 embracing the piston 23 is secured to the pneumatic cylinder 24 and the valve body and the pneumatic cylinder are connected together by means of the housing 26 which at one end threadably engages the member 25. At its opposed end the housing 26 is provided with an annular flange 27 whereat it and the annular flange 28 of the valve body 10 are secured together by the split ring clamp 29. This split ring 29 is provided with a pivoted screw threaded component 30 and wing nut 31 which engages about the bifurcated portion 32. By loosening the wing nut 31 the ring 29 may be readily disassociated and the valve body 10 and the housing 26 can be readily separated, whereupon on moving the pneumatic cylinder piston 23 to the position shown in FIG. 3 the interdigitated portions 20 and 21 may be readily separated by a tilting action of the valve stem portion 17 as shown by the arrow at FIG. 3.

As further shown in the drawings, the connector 26 is slotted so that even without disassembly of the connected parts atmospheric condensation may be removed from the components disposed within the connector body. As will be also apparent, the shield 22 stops passage of an oil which may leak from between the cylinder 22 and its piston 23 to avoid contamination of the milk being pumped. Also, of course, it will be apparent from the foregoing that the present construction and arrangement prevents introduction of air to the fluid being pumped. When the parts are separated, access may be had to gasket 33.

Although not shown, the pneumatic cylinder 24 is provided with the usual air inlet and outlet and can be connected to control means such as for example an electric starter button for initiating the withdrawal of the valve head 14 from its seat 13 and upon filling of the container with a predetermined weighed amount of liquid supported on a scale the predetermined amount causes a reversal of the air in the cylinder causing the valve to close.

I claim:
1. A valve assembly comprising a pneumatic cylinder including a cylinder piston, a valve body comprising a valve seat, a laterally extending inlet port and an axial outlet port, a valve stem and a valve head, a housing in separable engagement with said pneumatic cylinder and with said valve body, and means securing said valve body to said housing, adjacent terminal end portions of said cylinder piston and said valve stem being each formed with a freely interdigitating mutual engagement bent finger portion means separable from each other upon separation of said valve body from said housing.

2. The valve assembly of claim 1 wherein said housing comprises a slotted body and is in threaded engagement with said pneumatic cylinder and in clamped engagement with said valve body.

3. The valve assembly of claim 2 wherein said slotted body is connected to said valve body by means of a split ring clamp.

4. The valve assembly of claim 1 wherein said cylinder piston includes an integral concentric fluid shield.

References Cited

UNITED STATES PATENTS

| | | | |
|---|---|---|---|
| 1,209,145 | 12/1916 | Grabill | 137—312 |
| 2,355,434 | 8/1944 | Harter | 137—625.63 |
| 1,880,186 | 9/1932 | Knauf | 137—312 |
| 3,122,065 | 2/1964 | Laun | 251—62 X |
| 3,290,003 | 12/1966 | Kessler | 251—291 X |
| 3,387,628 | 6/1968 | Flint et al. | 251—282 X |

ARNOLD ROSENTHAL, Primary Examiner

U.S. Cl. X.R.
251—63.4, 291